F. HAECK.
Alcohol Still.
No. 51,403.  Patented Dec. 5, 1865.
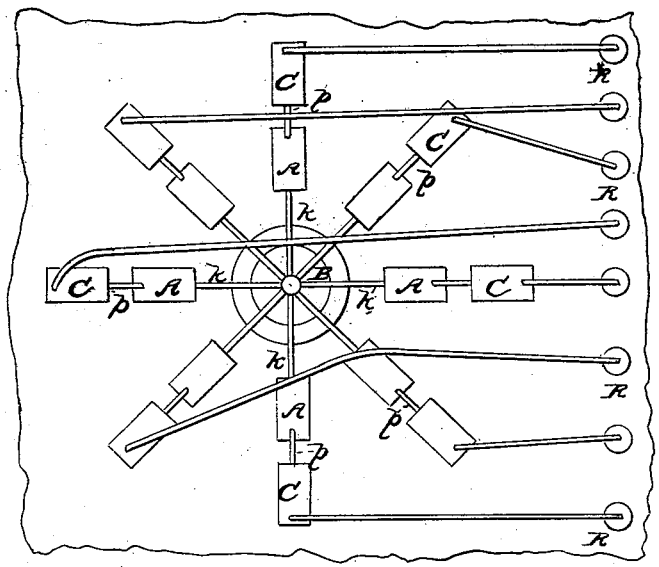
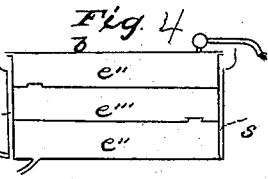
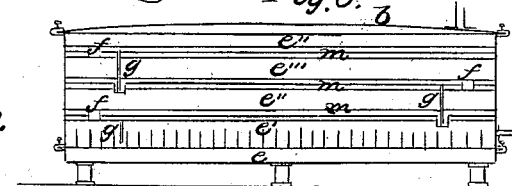
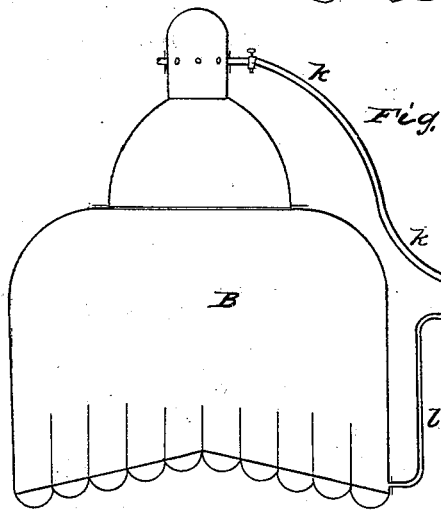
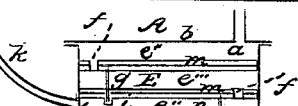
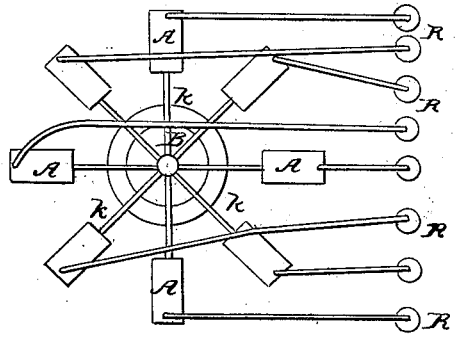
Witnesses:
Inventor:

UNITED STATES PATENT OFFICE.

FRANCOIS HAECK, OF BRUSSELS, BELGIUM.

IMPROVED APPARATUS FOR DISTILLING SPIRITS AND OTHER LIQUIDS.

Specification forming part of Letters Patent No. 51,403, dated December 5, 1865.

*To all whom it may concern:*

Be it known that I, FRANCOIS HAECK, of Brussels, in the Kindom of Belgium, have invented certain new and useful Improvements in Apparatus for the Distillation of Spirituous and other Liquids; and I do hereby declare that the following is a full, clear, and exact description of the said invention, reference being had to the accompanying drawings, in which—

Figure 1 represents a plan of a distilling apparatus embodying my improvements. Fig. 2 represents a vertical longitudinal section of certain parts thereof, drawn upon a larger scale. Figs. 3 and 4 represent vertical longitudinal sections of modifications of my apparatus, as will be hereinafter described; and Fig. 5 represents a plan of another modification of the apparatus.

The object of all distillation is to obtain a certain product as free as possible from extraneous substances. One of the obstacles to this end in the distillation of pure spirits is the mixture of watery particles, which are carried from the still or evaporator mechanically mixed with the vapor of the spirit, and which should be separated from it.

The object of the first part of my present invention is to separate such particles from the vapor of the spirit before the latter is analyzed, concentrated, or condensed; and it consists of an apparatus which I term a "separator," composed substantially of a series of large shallow chambers, through which the vapor from the evaporator is caused to pass in succession before it is conducted to the concentrator or to the condenser, so that time and space are afforded for the deposit of the watery particles which pass off from the evaporator mechanically mixed with the vapor of the spirit.

The second and third parts of my invention consist of the combinations of the separator with the evaporator, concentrator, and condenser.

The object of the fourth part of my invention is to permit distillation to be carried on continuously from a single evaporator, while at the same time the apparatus in which the operations of separation, concentration, and condensation are effected may be used intermittently, so that they may be cleansed.

This part of my invention consists of the combination of a single evaporator with a series of separators, concentrators, or condensers, so that the distillation of the material in the evaporator may proceed without cessation, and that any one of the separators, concentrators, or condensers of the series may be cut off from the evaporator by closing the connection therewith and cleansed, while another of the series is operating upon the vapor proceeding from the evaporator.

The object of the fifth part of the invention is to further the uniformity of the product produced by a series of separating or concentrating apparatus operating intermittently in connection with a single evaporator operating continuously; and it consists of the arrangement of the members of the series of separators or concentrators radially to the central evaporator, so that the connections may all be of the same length, and may be duplicates of each other.

The most convenient form in which I have constructed the separator for general use is that represented at A, Figs. 1 and 2, where a series of shallow rectangular pans, $m\ m\ m$, are inserted in a rectangular vessel, E, which is closed by a fixed bottom, $n$, at its lower side, and is closed at its upper side by a removable top, $b$, which is secured to the vessel by pressure-screws. The pans are constructed to fit tightly into the vessel, or the joint around their peripheries may be made sufficiently tight by packing to prevent the vapor from passing round them, and they are supported and maintained at fixed distances from each other by legs or other means. The joint at the top of the vessel may be made tight by grinding the parts to fit each other, or by packing, as deemed most expedient. The pans thus placed divide the vessel into a series of chambers, $e''\ e'''\ e^{IV}$, the lowermost of which, $e''$, is provided with an opening, $c$, for the entrance of vapor, and the uppermost of which is provided with an opening, $d$, for the escape of vapor from the apparatus. Each chamber communicates with that next above it by a vapor-passage, $f$, and the passages are made at alternately-opposite extremities of the chambers, so that the vapor entering each chamber is forced to traverse it horizontally before passing to the succeeding chamber, and as these chambers are large in proportion to the area of the passage required for the vapor, time and space are afforded for the deposition of the watery particles that enter the apparatus mechanically mixed with the vapor of the product to be condensed. In order that these depositions may escape without interfering with the circulation of the vapor, each pan is fitted with an escape-pipe, $g$, which communicates with the next pan nearer the opening at which the vapor enters the apparatus, and each of these connecting-pipes terminates in a cup, $i$, which acts as a trap to prevent the passage of vapor, while permitting the escape of liquid. The entrance-chamber $e''$ is fitted with a pipe, $h$, by which the liquid produced by the collected particles is conducted off.

The separator is connected directly with the evaporator B of the distillery by pipes $k$ $l$, so that the vapor from the evaporator can enter it at the passage $c$, and that the collected liquid may flow back into the evaporator through the pipe $l$. In case the vapor is to be analyzed and concentrated before condensation, the last chamber of the separator is connected by a pipe, $p$, with the analyzing-concentrator C, which may be constructed as described in my Patent dated the 8th day of November A. D. 1864, No. 45,001, and the analyzing-concentrator may be connected by a pipe with the condenser R, which may be constructed as described in my Patent dated the 8th day of November, 1864, No. 45,001. But in case the vapor is to be condensed without concentration, the separator may be connected directly with the condenser by a pipe leading from its last chamber, $e^{IV}$, as represented at Fig. 5.

In order that the distillation may proceed continuously from a single evaporator, and that the separators, concentrators, and condensers may nevertheless be opened and cleansed, a series of sets of these apparatuses are combined with a single continuous evaporator; and in order that the connections with the evaporator may be of uniform length, the separators and concentrators are arranged radially around the central evaporator, as represented at Fig. 1. The evaporator which I prefer to use in these combinations is a shallow vessel with its bottom divided by partitions, so as to form a continuous narrow channel, which communicates at one end by a pipe with a reservoir of the liquid to be distilled, and at the other by a similar pipe with the receptacle of spent liquid. If the evaporator be of circular form the channel will have the form of the spiral, and if the evaporator be rectangular the partitions will be parallel with one of its ends, and will extend from alternately opposite sides of the vessel nearly across it, so that the liquid is compelled to travel zigzag through the vessel. In either case I prefer to heat the vessel by forming it with a double bottom and admitting steam into the space between the two bottoms.

The separators A A A A are arranged radially around the central evaporator, and the concentrators C C C C (when concentrators are used) are arranged radially around the separators. Each concentrator is connected with a separate condenser, R, so that in the present example the evaporator is combined with eight sets of apparatuses for operating upon the vapor passing from it. The connecting-pipes between the evaporator and the surrounding apparatuses are fitted with stop-cocks, so that one or more of the surrounding apparatuses may be disconnected from the evaporator and its members opened and cleansed while one or more of the remaining sets is in connection with the evaporator and operating on the vapor. Hence the same evaporator may be used continuously without interfering with the proper and necessary cleansing of the apparatuses which operate upon the vapor. In the example represented in the drawings eight sets of apparatuses are shown surrounding the evaporator; but this number may be increased or diminished, as deemed expedient, to suit particular circumstances.

In those cases in which but one separator is used with an evaporator the former may be constructed directly above the latter in such manner that the two form one combined apparatus. In this case they may have the form represented in section at Fig. 3.

The exterior of the apparatus is rectangular. The evaporator $e'$ is fitted at its bottom with partitions, as before described, forming a continuous channel in which the liquid is caused to traverse, and it has a double bottom, forming the steam-chamber $e$, in which the steam which furnishes the requisite heat is introduced.

The separating-chambers $e''$ $e'''$ $e^{IV}$ are formed, as before described, by means of removable shallow pans $m$ $m$ $m$, fitted with suitable passages $f$ $f$ $f$ for the vapor, and return-pipes $g$ $g$ $g$ for the liquid, and the apparatus is closed at top by a removable cover, $b$, secured by pressure-screws, so that it may be removed to permit the apparatus to be cleansed.

In some cases it may be found expedient to moderate the heat of the separator. This may be done by constructing it with a water-jacket, as represented at $s$ $s$, Fig. 4, and water may be permitted to circulate through this jacket at the requisite speed to maintain the temperature at the required degree by regulating the supply of water by a cock in the supply-pipe.

In some cases it may be desirable to maintain the separator at as high a temperature as the evaporator, so as to prevent the condensation of spirituous vapor within it. In such cases the water-jacket may be supplied with hot water.

What I claim as my invention, and desire to secure by Letters Patent, is—

1. The separator herein described, consisting, substantially, of a series of chambers connected with each other by vapor-passages and liquid-escape pipes, and fitted with openings for the entrance and escape of vapor and liquid, so that the vapor is caused to circulate horizontally and slowly through the chambers in which the watery particles mechanically mixed with the vapor are permitted to deposit.

2. The combination of the said separator with an evaporator and a condenser of the vapor, so that the vapor produced by the evaporator is caused to pass through the separator before condensation, substantially as set forth.

3. The combination of the said separator with an evaporator and concentrator, so that the vapor produced by the evaporator is caused to pass through the separator before concentration, substantially as set forth.

4. The combination of a single evaporator with a series of apparatuses for operating upon the vapor, so that one or more of the latter may be worked intermittently while the evaporator is worked continuously, substantially as set forth.

5. The arrangement of a series of apparatuses for operating upon the vapor of a single evaporator radially around said evaporator, substantially as set forth.

In witness whereof I have hereunto set my hand.

FRANCOIS HAECK.

Witnesses:
LEON GRAVELGI,
JULES CUVELIER.